United States Patent
Litscher et al.

(10) Patent No.: US 7,500,649 B2
(45) Date of Patent: Mar. 10, 2009

(54) VACUUM VALVE DRIVE

(75) Inventors: Bernhard Litscher, Buchs (CH); Thomas Blecha, Feldkirch (AT)

(73) Assignee: Vat Holding AG, Seelistrasse (CH)

( * ) Notice: Subject to any disclaimer, the term of this patent is extended or adjusted under 35 U.S.C. 154(b) by 4 days.

(21) Appl. No.: 11/744,814

(22) Filed: May 4, 2007

(65) Prior Publication Data

US 2007/0257220 A1    Nov. 8, 2007

(30) Foreign Application Priority Data

May 5, 2006    (CH)    .................................... 0726/06

(51) Int. Cl.
*F16K 31/00*    (2006.01)
(52) U.S. Cl. ..................... 251/63.5; 251/326
(58) Field of Classification Search .................. 251/62, 251/63.5, 326, 327, 328, 329
See application file for complete search history.

(56) References Cited

U.S. PATENT DOCUMENTS

| | | | |
|---|---|---|---|
| 3,086,745 A * | 4/1963 | Natho | ........................ 251/62 |
| 4,809,950 A | 3/1989 | Geiser | |
| 4,881,717 A | 11/1989 | Geiser | |
| 4,928,577 A * | 5/1990 | Stoll | ............................ 92/177 |
| 6,056,266 A | 5/2000 | Blecha | |
| 6,085,777 A * | 7/2000 | Welker | ........................ 137/317 |
| 6,089,537 A | 7/2000 | Olmsted | |
| 6,390,442 B2 * | 5/2002 | Tokuda et al. | .............. 251/63.5 |
| 6,416,037 B1 | 7/2002 | Geiser | |
| 6,783,107 B2 * | 8/2004 | Chatufale | ..................... 251/54 |

FOREIGN PATENT DOCUMENTS

JP    06-241344    8/1994

\* cited by examiner

*Primary Examiner*—John K Fristoe, Jr.
(74) *Attorney, Agent, or Firm*—Muncy, Geissler, Olds & Lowe, PLLC.

(57) ABSTRACT

A vacuum valve drive for linear displacement of a valve closure along an adjustment axis between an opened and closed position, and a vacuum valve comprising the vacuum valve drive, are provided. The vacuum valve drive comprises a drive housing containing a gas tight working space, a piston inside the working space, and at least one connecting rod which is led from the working space in a gas-tight manner to the valve closure. A static guide rod extends centrally and parallel to the adjustment axis inside the working space and is led through the piston. A precision linear bearing is between the piston and the guide rod. The piston is linearly guided by the guide rod with high precision and centered in the working space so that the valve closure is moved with high precision and pressed onto the valve seat.

13 Claims, 4 Drawing Sheets

VACUUM VALVE DRIVE

FIELD OF DISCLOSURE

The invention relates to a vacuum valve drive for linear displacement of a valve closure along an adjustment axis between an opened position of the vacuum valve and a position in which it is closed gas-tight, according to the precharacterizing clause of claim 1, and a vacuum valve comprising a vacuum valve drive according to the precharacterizing clause of claim 13.

BACKGROUND

Vacuum valves for substantially gas-tight closure of a flow path which leads through an opening in a valve housing are known in different embodiments from the prior art. Vacuum gate valves are used in particular in the area of IC and semiconductor manufacture, which must take place in a protected atmosphere as far as possible without the presence of contaminating particles. For example, in a manufacturing plant for semiconductor wafers or liquid crystal substrates, the highly sensitive semiconductor or liquid crystal elements pass sequentially through a plurality of process chambers in which the semiconductor elements present inside the process chamber are processed by means of one processing apparatus in each case. Both during the processing procedure inside the process chamber and during transport from process chamber to process chamber, the highly sensitive semiconductor elements must always be present in a protected atmosphere—in particular in an air-free environment. The process chambers are connected to one another, for example, via connecting corridors, it being possible, by means of vacuum gate valves, to open the process chambers for transferring the parts from one manufacturing chamber to the next and subsequently to close said process chambers gas-tight for carrying out the respective manufacturing step. Such valves are also referred to as vacuum transfer valves owing to the field of use described and also as rectangular gate valves owing to their rectangular opening cross-section.

Very different embodiments of vacuum valves, in particular the sealing and drive technologies thereof, are known from the prior art. Depending on the respective drive technologies, a distinction is made in particular between gate valves, also referred to as valve gates or rectangular gates, and shuttle valves, the closing and opening in the prior art generally taking place in two steps. In a first step, a valve closure, in particular a closure disc, in the case of a gate valve, as disclosed, for example, in U.S. Pat. No. 6,416,037 (Geiser) or U.S. Pat. No. 6,056,266 (Blecha), is moved linearly over an opening substantially parallel to the valve seat or, in the case of a shuttle valve, as disclosed, for example, in U.S. Pat. No. 6,089,537 (Olmsted), is pivoted about a pivot axis over the opening without contact taking place between the closure disc and the valve seat of the valve housing as a result. In a second step, the closure disc is pressed with its closure side onto the valve seat of the valve housing so that the opening is closed gas-tight. Sealing can be effected, for example, either via a sealing ring which is arranged on the closure side of the closure disc and is pressed onto the valve seat running round the opening or via a sealing ring on the valve seat, against which the closure side of the closure disc is pressed.

Gate valves are also known in which the closing and sealing process is effected via a single linear movement. Such a valve is, for example, the transfer valve from VAT Vakuumventile AG in Haag, Switzerland, which is know by the product designation "MONOVAT series 02 and 03" and designed as a rectangular insert valve. The design and the mode of operation of such a valve are described, for example, in U.S. Pat. No. 4,809,950 (Geiser) and U.S. Pat. No. 4,881,717 (Geiser). The valve described there has, in its housing, a sealing surface which, viewed in the direction of the axis of the valve passage, has sections which are located one behind the other and become, via continuous curves, flat sealing surface sections running laterally outwards, the imaginary generators of this sealing surface which is in one part but has a plurality of sections being parallel to the axis of the valve passage. The sealing surface is processed. The closure member has a contact surface corresponding thereto for the circumferentially closed seal. Described in more detail, the so-called valve gate has a gate housing and a gate passage which can be closed by a closure member displaceable in its plane. Provided in the region of the gate passage is a sealing surface against which a circumferentially closed seal arranged on the closure member rests in the closed position of said closure member, the imaginary, straight generators of the sealing surface being parallel to the axis of the gate passage. The circumferentially closed, one-piece seal has sections of different lengths and/or shapes which are in different planes, two main sections of the circumferentially closed seal being in planes which are at right angles to the axis of the gate passage and a distance apart. The two main sections of the seal are connected by lateral sections. For running of the sealing surface of the housing, the closure member has a corresponding surface carrying the circumferentially closed seal. The lateral sections and the circumferentially closed seal are U-shaped. In each case the limbs of these U-shaped lateral sections are in a plane. Those sections of the sealing surface which are located one behind the other when viewed in the axial direction of the gate passage become flat sealing surface sections running laterally outwards for contact with the main sections of the seal in that region in which they have a common, straight generator parallel to the axis. These flat sealing surface sections are in planes parallel to one another and to the axis of the gate passage. Since the closure member comprises one part, it can be exposed to high acceleration forces, so that this valve can also be used for fast and emergency closures. Since the closing and sealing can be effected by means of a single linear movement, very fast closing and opening of the valve are possible.

A suitable drive with such a transfer valve which can be closed by means of a linear movement is described in JP 6241344 (Buriida Fuuberuto). The drive described there has eccentrically mounted levers for linear displacement of the connecting rods on which the closure member is mounted.

SUMMARY

The dimensions of the drive of the vacuum valve have a direct influence on the overall dimension of the vacuum chamber system since the vacuum valves are arranged between the process chambers which are close together in some cases. It is therefore desirable to design the drive to be as flat as possible in the direction of flow so that the distances between the process chambers can be reduced to what is absolutely necessary. There is therefore the desire to design the drives known from the prior art for transfer valve which can be closed by means of a linear movement so that said drives are even flatter.

Since transfer valves are used particularly in the production of highly sensitive semiconductor elements, the particle generation caused by the actuation of the valve must be kept as low as possible. The particle generation is directly associated with the precision of the guidance and of the driving of the moving parts, in particular of the valve closure, since it is primarily a consequence of friction, in particular between the valve closure, the valve housing and the valve seat. However, fast opening and closing of the valve are also desired for reducing the transfer times. Owing to insufficient damping of the drive and of the valve closure, undesired material contacts and hence increased particle generation may occur. Owing to new and improved manufacturing processes in the semiconductor industry, the in any case already very high requirements with regard to a low level of particles have further increased.

The requirement for a vacuum valve drive which firstly is designed to be as compact as possible—in particular flat—and secondly permits fast valve actuation and is also distinguished by a highly precise, damped linear movement in order to keep the particle generation in the vacuum valve low therefore appears to constitute a conflict of aims which it has not been possible to solve to date.

It is therefore an object of the invention to provide a vacuum valve drive by means of which the particle generation in a vacuum valve to be opened and to be closed by means of a linear movement, in particular a vacuum transfer valve, is kept as low as possible and which is distinguished by reduced external dimensions, in particular in the direction of flow.

This object is achieved by realising the characterizing features of the independent claim. Features which further develop the invention in an alternative or advantageous manner are described in the dependent patent claims.

The vacuum valve drive according to the invention serves for the linear displacement of a valve closure, in particular of a valve disc, along an adjustment axis between an opened position of the vacuum valve and a position in which it is closed gas-tight. The vacuum valve is in particular in the form of a transfer valve which can be actuated by means of a linear movement and has a substantially rectangular opening cross-section, as described, for example, in JP 6241344 (Burrida Fuuberuto) or as known as "VAT MONOVAT series 02 and 03". However, it is also possible to use the valve drive according to the invention for another vacuum valve, the valve closure of which is to be displaced linearly. Adjustment axis is to be understood as meaning that axis along which or parallel to which the linear movement takes place. Of course, a plurality of parallel adjustment axes is therefore possible. The vacuum valve drive has a drive housing which contains a substantially gas-tight working space. Arranged in the working space is a piston displaceable along the adjustment axis inside the working space. The piston is arranged in such a way that it divides the working space into a first pressure space and a second pressure space, the pressure spaces being separated in a substantially gas-tight manner by the piston. For this purpose, the piston and the working space have a similar cross-section, at least one piston packing or at least one piston ring sealing substantially gas-tight the lateral intermediate space between the outer surface of the piston and the inner surface of the working space. The piston and the working space preferably have an elongated—in particular slot-like or oval—cross-section, the cross-sectional length preferably being at least twice -in particular at least three times, four times or five times—the cross-sectional width. Thus, it is possible to form the vacuum valve drive to be very flat. At least one connecting rod extending parallel to the adjustment axis is fixed to the piston. The at least one connecting rod is led in a gas-tight manner out of the working space into the outer region of the drive housing to the valve closure so that the piston is coupled to the valve closure and a movement of the piston along the adjustment axis leads to a corresponding movement of the valve closure along the adjustment axis.

Instead of a connecting rod, it is possible to provide a plurality of connecting rods for coupling the piston to the valve closure, it being possible for the connecting rod to have not only a round cross-section but any desired cross-section suitable for gas-tight guidance from the working space into the outer region. A first connection and a second connection are provided on the drive housing, via which connections the first pressure space and the second pressure space can be subjected to gas pressure so that the valve closure arranged on the at least one connecting rod is adjustable between the opened position and the closed position by production of a gas pressure difference between the first pressure space and the second pressure space. A suitable gas is, for example, air from a pneumatic circulation. The first and second connection is to be understood abstractly as meaning a gas interface of the drive. It is possible to form this gas interface as a single connection and to distribute the pressure over the two pressure spaces, for example by means of at least one adjusting valve inside the drive housing. It is also possible to connect one of the two pressure spaces to the ambient atmosphere and to subject the other pressure space to different pressures, in particular superatmospheric and reduced pressure. These alternatives are likewise within the scope of the invention and are covered by the above formulation. The invention provides at least one guide rod which is arranged statically inside the working space and extends parallel to the adjustment axis—in particular centrally—inside the working space. The guide rod is led in a substantially gas-tight manner through the piston, for example a guide rod seal arranged in the piston and providing a radial seal on the inside preventing the passage of gas. At least one precision linear bearing is arranged between the piston and the guide rod so that the piston is mounted in a linearly displaceable manner on the guide rod without radial play relative to the piston rod. A rotation of the piston about the piston rod can be prevented, for example, by means of a piston guide band which is present in the lateral intermediate space between the outer surface of the piston and the inner surface of the working space, and/or the at least one connecting rod. The guide rod need not necessarily have a round cross-section but can have any desired cross-section suitable for linear guidance.

Owing to the highly precise linear guidance of the piston and hence also of the valve closure coupled to it, which is achieved by means of the guide rod and the precision linear bearing, it is possible to displace the valve closure precisely in the vacuum valve without resulting in undesired contact between the valve closure and the valve housing, in particular a skew position of the valve closure on the valve seat, even in the case of large forces acting on the valve closure.

The precision linear bearing is, for example, in the form of a precision linear sliding bearing or precision linear roller bearing. The precision linear sliding bearing is formed in particular by a guide sleeve which is arranged on the piston and surrounds the guide rod substantially radially without play in the manner of a sliding bearing. The precision linear roller bearing is composed, for example, of a guide sleeve, which is fixed to the piston and surrounds the guide rod, and a sleeve-like separator which holds roll bodies between the guide rod and the guide sleeve. Here, the guide sleeve is mounted radially without play on the guide rod in a linearly displaceable manner. Such linear roller bearings are generally known from the prior art. The separator follows the stroke of the guide sleeve at approximately half the speed. The roll bodies may be in the form of a multiplicity of balls distributed in a plurality of rows around the guide rod and parallel to the adjustment axis. Of course, it is possible to use other precision linear bearings.

A further development of the invention provides two connecting rods which extend parallel to the adjustment axis and are fixed to the piston opposite the guide rod, which in particular is central. The two connecting rods are led from the working space in a gas-tight manner into the outer region of the drive housing to the valve closure.

In an embodiment, a channel opening into the second pressure space is formed inside the guide rod. This channel connects the second pressure space to the second connection which is arranged on the drive housing, on the side of the first pressure space. This makes it possible to arrange both connections on the same side of the drive housing without increasing the dimensions of the drive housing by additional lines. The otherwise usual lateral connection for the second pressure space can be omitted. Since the gas connections can thus be made from a single side, construction space can additionally be saved and, on use in a vacuum chamber system, a close arrangement of the process chambers is permitted.

In order to improve the damping behaviour of the drive, a further development of the invention which is based on the above embodiment provides pneumatic damping. A damping bore is formed in the second pressure space in the drive housing, which pressure space is arranged on the valve side of the drive housing. A partial section of the guide rod is led through the damping bore centrally and radially at a distance, forming a sleeve-like space closed towards the valve side and open towards the piston side. A damping bore seal is arranged in the damping bore on the inner edge section on the piston side. Furthermore, a flow path bypassing the damping bore seal, in particular an additional channel leading from the damping bore into the second pressure space, is provided. The channel formed inside the guide rod opens into that partial section of the guide rod which is surrounded by the damping bore. The guide sleeve, the damping bore, the damping bore seal and optionally the separator, in the case of a precision linear roller bearing, are dimensioned and arranged here in such a way that, on going over from the opened position into the closed position of the vacuum valve, the guide sleeve is introduced into the damping bore, a substantially radially sealing contact being produced between the damping bore seal and the guide sleeve so that pneumatic damping is effected on going over into the closed position by gas displacement via the flow path, in particular the additional channel. In the case of a large excess pressure in the first pressure space and consequently a large adjustment speed of the valve to the closed position of the vacuum valve, an opposite pressure which counteracts the movement and can decrease only relatively slowly via the flow path, in particular the additional channel, builds up in the damping bore after penetration of the guide sleeve and hence shortly before the closed position is reached. As a result, the damping bore acts as a damper which brakes the valve closure shortly before the closed position is reached and prevents the valve closure from striking the valve seat too rapidly. The active build-up of an opposite pressure in the second pressure space, which is otherwise required for braking the valve closure, can therefore be dispensed with.

In addition, the invention comprises a vacuum valve, in particular a transfer valve, as described in JP 6241344 (Buriida Fuuberuto) or U.S. Pat. No. 4,809,950 (Geiser), for substantially gas-tight closing of a flow path, comprising a valve housing having an opening, in particular a rectangular one, for the flow path and a valve seat, and a valve closure which is linearly displaceable along an adjustment axis between an opened position unblocking the opening and a position in which the vacuum valve is closed gas-tight and in which the valve closure is linearly displaced over the opening and hence pressed onto the valve seat. According to the invention, the vacuum valve comprises the vacuum valve drive described above for linear displacement of the valve closure along the adjustment axis between the opened position and the position in which the vacuum valve is closed gas-tight.

BRIEF DESCRIPTION OF THE DRAWINGS

The apparatus according to the invention is described in more detail below, purely by way of example, with reference to a specific working example shown schematically in the drawings. Specifically.

DETAILED DESCRIPTION

Figure 1:
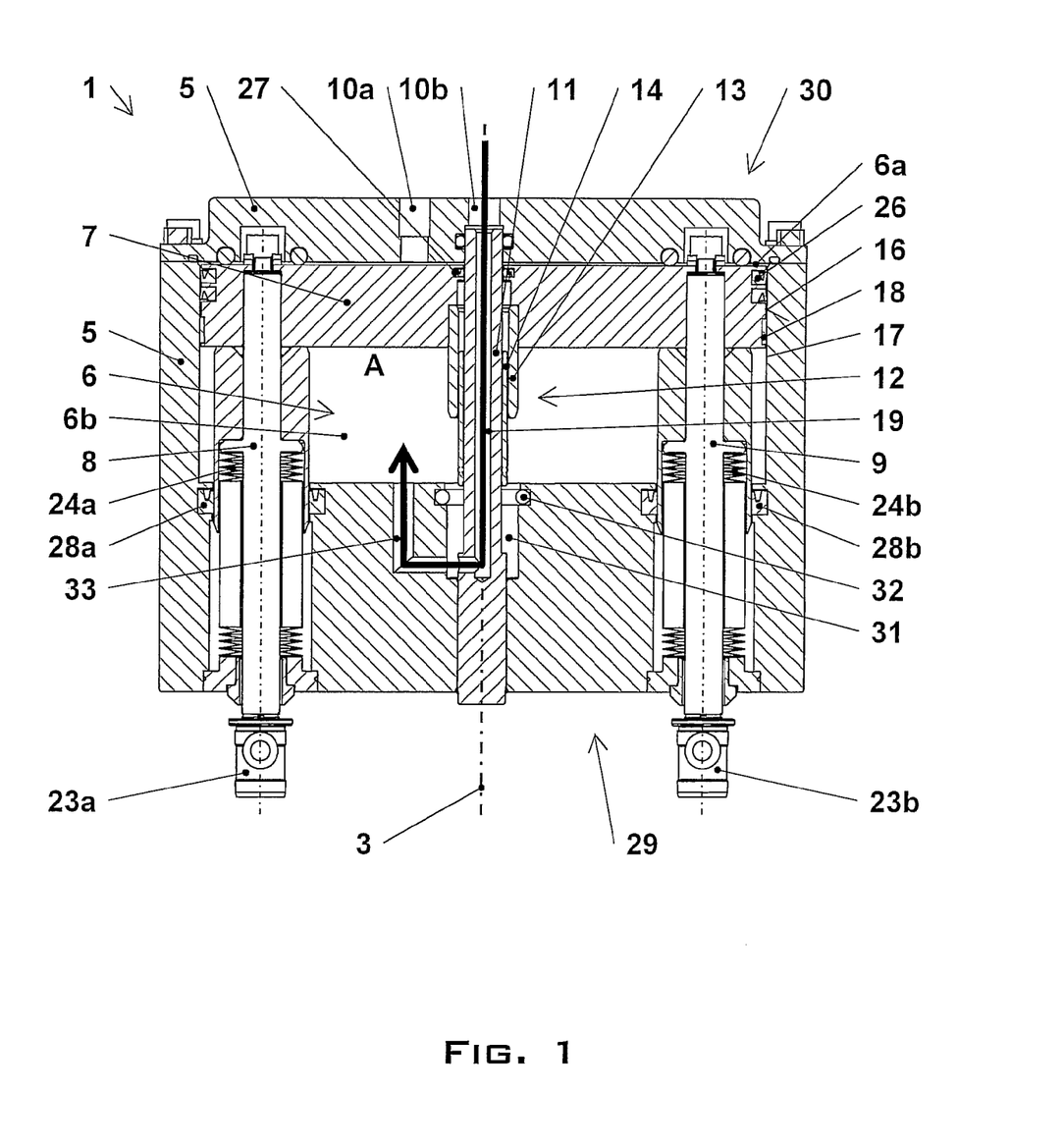
FIG. 1 shows a vacuum valve drive in the opened position in a cross-sectional side view.
Figure 2:
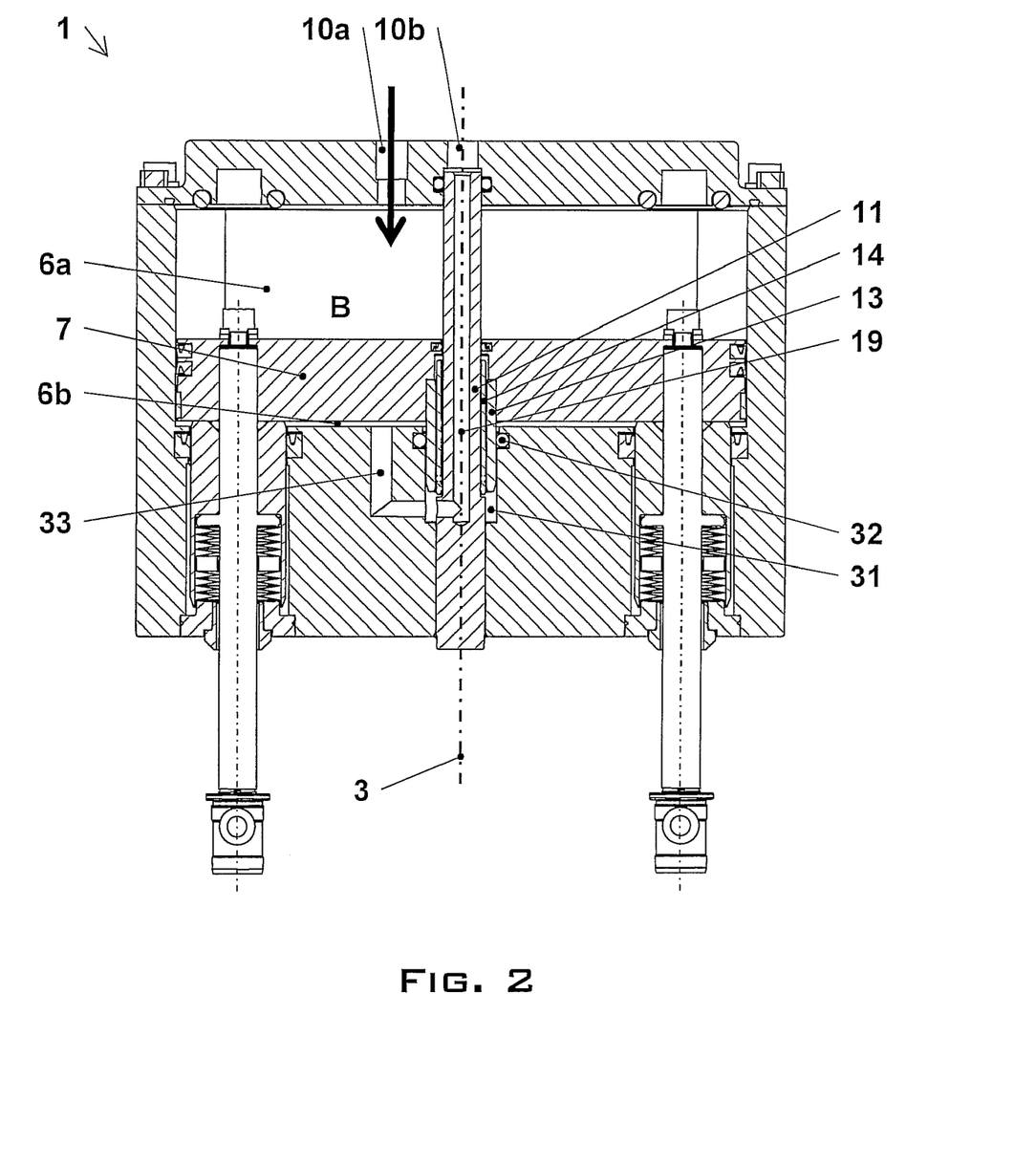
FIG. 2 shows the vacuum valve drive in the closed position in the cross-sectional side view.
Figure 3:
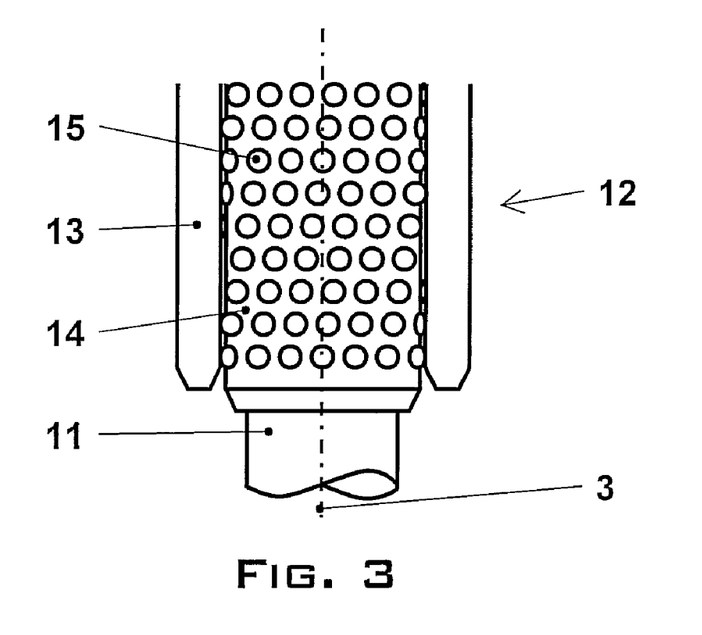
FIG. 3 shows a detailed view of a precision linear roller bearing having a guide sleeve and a sleeve-like separator.
Figure 4:
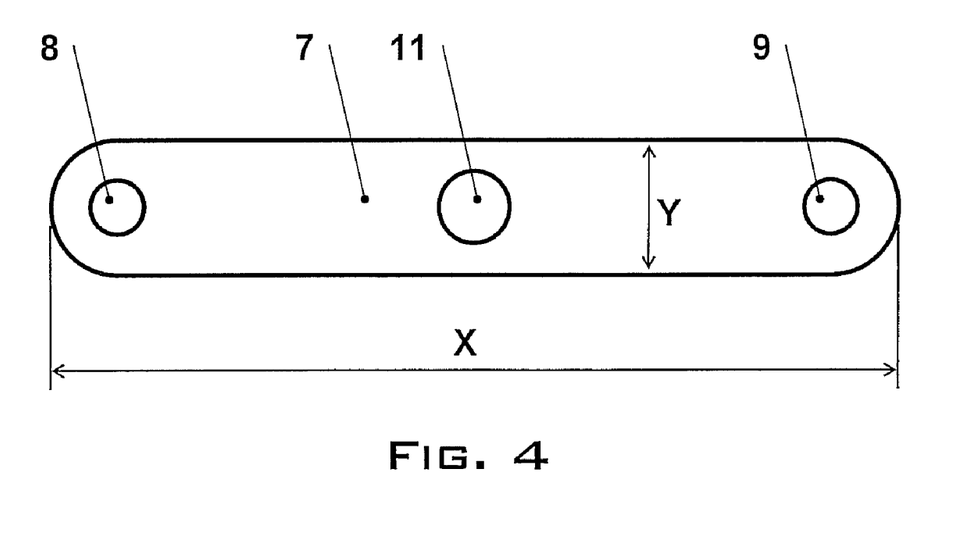
FIG. 4 shows a plan view of the piston.

Below, FIGS. 1 to 5 are described in some cases together, reference numerals already explained beforehand in individual Figures not being discussed again separately. FIG. 1 shows a possible embodiment of a vacuum valve drive 1 according to the invention in a lateral cross-sectional view, the vacuum valve drive 1 being in the completely opened position A in which a valve closure 2 (cf. FIG. 5) mounted on the vacuum valve drive 1 is completely opened. FIG. 2 shows the same vacuum valve drive 1 in the closed position B. The vacuum valve drive 1 shown comprises a multipart drive housing 5 which contains a substantially gas-tight working space 6. The working space 6 has a slot-like cross-section in plan view in the direction of the adjustment axis 3. A piston 7 which is displaceable along the adjustment axis 3 is arranged inside the working space 6 in such a way that the piston 7 divides the working space 6 into a first pressure space 6a present on the connection side 30 and a second pressure space 6b arranged on the valve side 29. The pressure spaces 6a and 6b are separated substantially gas-tight by the piston 7. For this purpose, the piston 7 and the working space 6 have a cross-section corresponding to one another, the lateral all-round gap between the outer surface 16 of the piston and the inner surface 17 of the working space 6 being closed gas-tight by means of two piston packings 26 surrounding the piston 7. The piston 7 and the working space 6 have an elongated, in this case slot-like, alternatively oval, cross-section, the cross-sectional length X being more than twice, in the present case more than five times, the cross-sectional width Y, as shown in the plan view of the piston 7 in FIG. 4. This makes it possible to make the drive housing extremely flat so that a space-saving arrangement of the vacuum valve is possible.

Two connecting rods 8 and 9 which extend parallel to the adjustment axis 3 and are led to the valve side 29 from the second pressure space 6b of the working space 6 in a gas-tight manner by means of one connecting rod seal 28a and 28b each into the outer region of the drive housing 5 are fixed to the piston 7. In each case a mounting peg 23a and 23b on which the valve closure 2 can be mounted is present at the end of the connecting rods 8 and 9. For a gas-tight seal between the valve housing 20 (cf. FIG. 5) and the ambient atmosphere, a bellows lead-through 24a and 24b, respectively, is provided for each connecting rod 8 and 9, as known from the prior art.

The piston 7 is guided linearly along the adjustment axis 3 via a static guide rod 11 extending parallel to the adjustment axis 3 and centrally inside the working space 6 and connected to the drive housing 5. The guide rod 11 has a round cross-section but may also have any other desired suitable cross-section. The two connecting rods 8 and 9 extending parallel to the adjustment axis 3 are fixed to the piston 7, opposite the central guide rod 11, as also shown in plan view in FIG. 4. Thus, the two connecting rods 8 and 9, the guide rod 11 and the adjustment axis 3 are parallel to one another, the guide rod 11 extending in the middle between the connecting rods 8 and 9. The central guide rod 11 is led in a substantially gas-tight manner through the piston 7, a guide rod seal 27 in the form of an O-ring arranged on the piston 7 substantially preventing gas exchange between the first and the second pressure spaces 6a and 6b.

A precision linear roller bearing 12 for highly precise linear guidance of the piston 7 and hence also of the connecting rods 8 and 9 and of the valve closure 2 mounted thereon is arranged between the piston 7 and the guide rod 11. This precision linear roller bearing 12 is shown in more detail in FIG. 3 and is composed of a guide sleeve 13, which is fixed to the piston 7, in particular by means of adhesive bonding, and surrounds the guide rod 11, and a sleeve-like separator 14. The separator 14 holds roll bodies 15 between the guide rod 11 and the guide sleeve 13 in such a way that the guide sleeve 13 is mounted radially without play on the guide rod 11 so as to be linearly displaceable along the adjustment axis 3. The roll bodies are formed by a multiplicity of balls 15 distributed in a plurality of rows around the guide rod 11 and parallel to the adjustment axis 3. Such precision linear roller bearings 12 are generally known from the prior art. The separator 14 executes a stroke of the piston 7 and of the guide sleeve 13 approximately at half speed and thus moves only half way between the positions A and B, as is clearly evident from the respective position of the separator 14 relative to the guide sleeve 13 in FIGS. 1 and 2. A piston guide band 18 resting on the adjacent inner surface 17 of the working space 6 and running parallel to the piston packings 26 is arranged on the outer surface 16 of the piston in such a way that the piston 7 is prevented from rotating about the guide rod axis. The piston 7 is linearly guided with high precision and centred in the working space 6 by the guide rod 11 so that the valve closure 2 coupled thereto is moved with high precision and pressed onto the valve seat 22 (cf. FIG. 5), any particle generation by undesired friction being avoided.

In an alternative embodiment, a precision linear sliding bearing is used instead of the precision linear roller bearing 12. In this case, the separator 14 and the roll bodies 15 are omitted. The distance between the guide rod 11 and the guide sleeve 13 should be chosen to be so small that the guide sleeve 13, which is arranged on the piston 7, surrounds the guide rod 11 substantially radially without play in the manner of a sliding bearing, so that play-free linear mounting is achieved.

A first connection 10a on the drive housing 5, which leads into the first pressure space 6a, makes it possible to apply gas pressure to the first pressure space 6a, as shown by the arrow in FIG. 1. For application of pressure to the second pressure space 6b, a second connection 10b leading into the second pressure space 6b (cf. arrow in FIG. 2) is provided adjacent on the same connection side 30 on the drive housing 5 so that the valve closure 2 arranged on the connecting rods 8 and 9 can be moved between the opened position A and the closed position B by producing a gas pressure difference between the first pressure space 6a and the second pressure space 6b. The connection between the second connection 10b and the second pressure space 6b is permitted by a channel 19 which opens into the second pressure space 6b and is formed inside the guide rod 11 in the form of a longitudinal bore. The flow path through the channel 9 is illustrated in FIG. 2 by means of the arrow.

In the second pressure space 6b arranged on the valve side 29 of the drive housing 5, a damping bore 31 is formed in the drive housing 5. A partial section of the guide rod 11 is led centrally and radially a distance away through the damping bore 31 so that a sleeve-like space closed towards the valve side 29 and open towards the piston side is formed. A damping bore seal 32 in the form of an O-ring is present in the damping bore 31, on the inner edge section on the piston side. An additional channel 33 which leads from the damping bore 31 into the second pressure space 6b and forms a flow path bypassing the damping bore seal 32 is also provided in the drive housing 5. The channel 19 formed inside the guide rod 11 opens into that partial section of the guide rod 11 which is surrounded by the damping bore 31. The guide sleeve 13, the separator 14, the damping bore 31 and the damping bore seal 32 are dimensioned and arranged in such a way that, on going over from the opened position A into the closed position B (cf. FIG. 2), the guide sleeve 13 is introduced into the damping bore 31 and a substantially radially sealing contact is produced between the damping bore seal 32 and the guide sleeve 13. Thus, an excess pressure builds up briefly in the damping bore 31 during the closing process, with the result that the closing valve closure 2 is braked before reaching the closed position B, owing to the gas displacement via the additional channel 33. The arrangement described thus provides pneumatic damping on going over into the closed position B, so that damage to the valve closure 2 and undesired particle generation can be avoided even on fast valve actuation. By means of the guide rod 11, the piston 7 is thus guided linearly, centred in the working space 6 and damped in combination with the damping bore 31 shortly before reaching the closed position B. Moreover, the gas feed into the second pressure space 6b is facilitated since both connections 10a and 10b can be arranged on a common connection side 30 on the drive housing 5.

Figure 5:
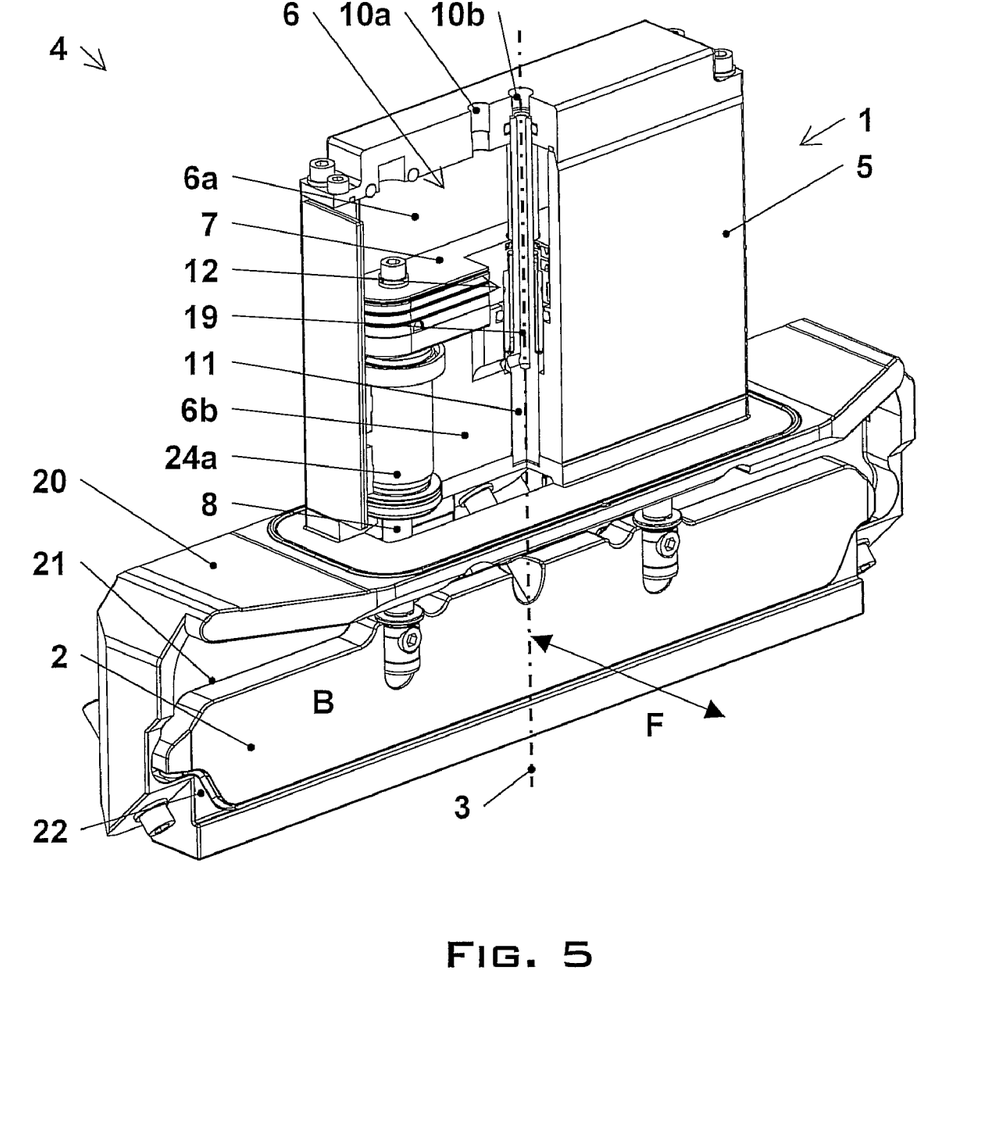
FIG. 5 shows an oblique view of a vacuum valve comprising a valve housing, a valve closure and the vacuum valve drive in the closed position.

FIG. 5 shows a vacuum valve 4 for substantially gas-tight closing of a flow path F, comprising a valve housing 20 having an opening 21 for the flow path F and a valve seat 22, and comprising the vacuum valve drive 1 already described above, the vacuum valve 4 being in the closed position B. The valve closure 2 is linearly displaceable along the adjustment axis 3 (cf. FIGS. 1 and 2), between an opened position A unblocking the opening 21 and a position B in which the vacuum valve 4 is closed gas-tight and the valve closure is linearly displaced over the opening 21 and hence pressed onto the valve seat 22, as shown in FIG. 5. The vacuum valve drive 1 already described serves for the linear displacement of the valve closure 2 along the adjustment axis 3 between the opened position A and the position B with gas-tight closure. By means of the bellows lead-throughs 24a and 24b, the connecting rods 8 and 9 are introduced in a gas-tight manner into the valve housing 20 and connected to the valve closure 2 inside the valve housing 20. FIG. 5 illustrates the flat design of the vacuum valve 4, in particular of the vacuum valve drive 1 in the direction of the flow path F, permitted by the vacuum valve drive 1 according to the invention. Thus, a space-saving and flexible arrangement of the vacuum valve is possible.

FIGS. 1 and 5 show a possible embodiment of the invention. Of course, the invention is not limited to this embodiment. Alternative designs of the vacuum valve and of the vacuum valve drive are possible within the scope of the invention.

What is claimed is:

1. A Vacuum valve drive for linear displacement of a valve closure along an adjustment axis between an opened position of the vacuum valve and a position in which it is closed gas-tight, comprising
- a drive housing which contains a substantially gas-tight working space,
- a piston which is displaceable inside the working space along the adjustment axis and is arranged in such a way that the piston divides the working space into a first pressure space and a second pressure space, the pressure spaces being separated by the piston in a substantially gas-tight manner,
- means for linear guidance of the piston along the adjustment axis,
- at least one connecting rod which extends parallel to the adjustment axis and is fixed to the piston and is led from the working space in a gas-tight manner into the outer region of the drive housing to the valve closure,
- a first connection of the drive housing, which leads into the first pressure space and by means of which gas pressure can be applied to the first gas space,
- a second connection in the drive housing, which leads into the second pressure space and by means of which gas pressure can be applied to the second pressure space so that the valve closure arranged on the at least one connecting rod can be moved between the opened position and the closed position by producing a gas pressure difference between the first pressure space and the second pressure space, wherein the means for linear guidance of the piston are in the form of
- at least one static guide rod which is connected to the drive housing and which extends parallel to the adjustment axis inside the working space and is led in a substantially gas-tight manner through the piston, and
- at least one precision linear bearing between the piston and the guide rod.

2. The Vacuum valve drive according to claim 1, wherein the piston and the working space have an elongated—in particular slot-like or oval—cross-section.

3. The Vacuum valve drive according to claim 2, wherein the cross-sectional length of the cross-section of the piston and of the working space is at least twice the cross-sectional width.

4. The Vacuum valve drive according to claim 1, further comprising:
- a guide rod extending centrally inside the working space being provided.

5. A Vacuum valve for substantially gas-tight closing of a flow path, comprising
- a valve housing having an opening for the flow path and a valve seat and
- a valve closure which is linearly displaceable along an adjustment axis between an opened position unblocking the opening and a position in which the vacuum valve is closed gas-tight and the valve closure is moved linearly over the opening and hence pressed onto the valve seat, characterized by the vacuum valve drive according to claim 1 for linear displacement of the valve closure along the adjustment axis between the opened position and the position with gas-tight closure.

6. A Vacuum valve drive for linear displacement of a valve closure along an adjustment axis between an opened position of the vacuum valve and a position in which it is closed gas-tight, comprising
- a drive housing which contains a substantially gas-tight working space,
- a piston which is displaceable inside the working space along the adjustment axis and is arranged in such a way that the piston divides the working space into a first pressure space and a second pressure space, the pressure spaces being separated by the piston in a substantially gas-tight manner,
- means for linear guidance of the piston along the adjustment axis,
- at least one connecting rod which extends parallel to the adjustment axis and is fixed to the piston and is led from the working space in a gas-tight manner into the outer region of the drive housing to the valve closure,
- a first connection of the drive housing, which leads into the first pressure space and by means of which gas pressure can be applied to the first gas space,
- a second connection in the drive housing, which leads into the second pressure space and by means of which gas pressure can be applied to the second pressure space so that the valve closure arranged on the at least one connecting rod can be moved between the opened position and the closed position by producing a gas pressure difference between the first pressure space and the second pressure space, wherein the means for linear guidance of the piston are in the form of
- at least one static guide rod which extends parallel to the adjustment axis inside the working space and is led in a substantially gas-tight manner through the piston, and
- at least one precision linear bearing between the piston and the guide rod, and wherein the precision linear bearing is in the form of a precision linear sliding bearing comprising a guide sleeve which is arranged on the piston and surrounds the guide rod substantially radially without play in the manner of a sliding bearing.

7. A Vacuum valve drive for linear displacement of a valve closure along an adjustment axis between an opened position of the vacuum valve and a position in which it is closed gas-tight, comprising
- a drive housing which contains a substantially gas-tight working space,
- a piston which is displaceable inside the working space along the adjustment axis and is arranged in such a way that the piston divides the working space into a first pressure space and a second pressure space, the pressure spaces being separated by the piston in a substantially gas-tight manner,
- means for linear guidance of the piston along the adjustment axis,
- at least one connecting rod which extends parallel to the adjustment axis and is fixed to the piston and is led from the working space in a gas-tight manner into the outer region of the drive housing to the valve closure,
- a first connection of the drive housing, which leads into the first pressure space and by means of which gas pressure can be applied to the first gas space,
- a second connection in the drive housing, which leads into the second pressure space and by means of which gas pressure can be applied to the second pressure space so that the valve closure arranged on the at least one connecting rod can be moved between the opened position and the closed position by producing a gas pressure difference between the first pressure space and the second pressure space, wherein the means for linear guidance of the piston are in the form of
- at least one static guide rod which extends parallel to the adjustment axis inside the working space and is led in a substantially gas-tight manner through the piston, and
- at least one precision linear bearing between the piston and the guide rod, and wherein the precision linear bearing is in the form of a precision linear roller bearing.

8. The Vacuum valve drive according to claim 7, wherein the precision linear roller bearing is in the form of
- a guide sleeve which is arranged on the piston and surrounds the guide rod, and
- a sleeve-like separator which holds roll bodies between the guide rod and the guide sleeve in such a way that the guide sleeve is mounted radially without play on the guide rod in a linearly displaceable manner.

9. The Vacuum valve drive according to claim 8, wherein the roll bodies is in the form of a multiplicity of balls distributed in a plurality of rows around the guide rod and parallel to the adjustment axis.

10. A Vacuum valve drive for linear displacement of a valve closure along an adjustment axis between an opened position of the vacuum valve and a position in which it is closed gas-tight, comprising
- a drive housing which contains a substantially gas-tight working space,
- a piston which is displaceable inside the working space along the adjustment axis and is arranged in such a way that the piston divides the working space into a first pressure space and a second pressure space, the pressure spaces being separated by the piston in a substantially gas-tight manner,
- means for linear guidance of the piston along the adjustment axis,
- at least one connecting rod which extends parallel to the adjustment axis and is fixed to the piston and is led from the working space in a gas-tight manner into the outer region of the drive housing to the valve closure,
- a first connection of the drive housing, which leads into the first pressure space and by means of which gas pressure can be applied to the first gas space,
- a second connection in the drive housing, which leads into the second pressure space and by means of which gas pressure can be applied to the second pressure space so that the valve closure arranged on the at least one connecting rod can be moved between the opened position and the closed position by producing a gas pressure difference between the first pressure space and the second pressure space, wherein the means for linear guidance of the piston are in the form of
- at least one static guide rod which extends parallel to the adjustment axis inside the working space and is led in a substantially gas-tight manner through the piston, and
- at least one precision linear bearing between the piston and the guide rod, wherein the piston and the working space have an elongated—in particular slot-like or oval—cross-section, and a piston guide band resting on the adjacent inner surface of the working space being arranged on the outer surface of the piston so that the piston is prevented from rotating about the guide rod axis.

11. A Vacuum valve drive for linear displacement of a valve closure along an adjustment axis between an opened position of the vacuum valve and a position in which it is closed gas-tight, comprising
- a drive housing which contains a substantially gas-tight working space,
- a piston which is displaceable inside the working space along the adjustment axis and is arranged in such a way that the piston divides the working space into a first pressure space and a second pressure space, the pressure spaces being separated by the piston in a substantially gas-tight manner,
- means for linear guidance of the piston along the adjustment axis,
- at least one connecting rod which extends parallel to the adjustment axis and is fixed to the piston and is led from the working space in a gas-tight manner into the outer region of the drive housing to the valve closure,
- a first connection of the drive housing, which leads into the first pressure space and by means of which gas pressure can be applied to the first gas space,
- a second connection in the drive housing, which leads into the second pressure space and by means of which gas pressure can be applied to the second pressure space so that the valve closure arranged on the at least one connecting rod can be moved between the opened position and the closed position by producing a gas pressure difference between the first pressure space and the second pressure space, wherein the means for linear guidance of the piston are in the form of
- at least one static guide rod which extends parallel to the adjustment axis inside the working space and is led in a substantially gas-tight manner through the piston, and
- at least one precision linear bearing between the piston and the guide rod, and
- a guide rod extending centrally inside the working space being provided, wherein two connecting rods which extend parallel to the adjustment axis and are fixed to the piston, opposite the central guide rod, and are led from the working space in a gas-tight manner into the outer region of the drive housing to the valve closure are provided.

12. A Vacuum valve drive for linear displacement of a valve closure along an adjustment axis between an opened position of the vacuum valve and a position in which it is closed gas-tight, comprising
- a drive housing which contains a substantially gas-tight working space,
- a piston which is displaceable inside the working space along the adjustment axis and is arranged in such a way that the piston divides the working space into a first pressure space and a second pressure space, the pressure spaces being separated by the piston in a substantially gas-tight manner,
- means for linear guidance of the piston along the adjustment axis,
- at least one connecting rod which extends parallel to the adjustment axis and is fixed to the piston and is led from the working space in a gas-tight manner into the outer region of the drive housing to the valve closure,
- a first connection of the drive housing, which leads into the first pressure space and by means of which gas pressure can be applied to the first gas space,
- a second connection in the drive housing, which leads into the second pressure space and by means of which gas pressure can be applied to the second pressure space so that the valve closure arranged on the at least one connecting rod can be moved between the opened position and the closed position by producing a gas pressure difference between the first pressure space and the second pressure space, wherein the means for linear guidance of the piston are in the form of
- at least one static guide rod which extends parallel to the adjustment axis inside the working space and is led in a substantially gas-tight manner through the piston, and
- at least one precision linear bearing between the piston and the guide rod, and wherein a channel which opens into the second pressure space and connects the second pressure space to the second connection which is arranged on the drive housing on the side of the first pressure space is formed inside the guide rod.

13. The Vacuum valve drive according to claim 12, further comprising:
- a damping bore being formed in the second pressure space in the drive housing, which pressure space is arranged on the valve side of the drive housing,
- a partial section of the guide rod being led centrally and radially a distance away through the damping bore so that a sleeve-like space closed towards the valve side and open towards the piston side is formed,
- a damping bore seal being arranged on the inner edge section on the piston side in the damping bore,
- a flow path bypassing the damping bore seal, in particular an additional channel leading from the damping bore into the second pressure space, being provided,
- the channel formed inside the guide rod opening into that partial section of the guide rod which is surrounded by the damping bore, and
- the guide sleeve, the damping bore, the damping bore seal and in particular the separator being dimensioned and arranged in such a way that, on going over from the opened position into the closed position (B), the guide sleeve is introduced into the damping bore and a substantially radially sealing contact is produced between the damping bore seal and the guide sleeve so that pneumatic damping is effected on going over into the closed position by gas displacement via the flow path, in particular the additional channel.

* * * * *